June 20, 1967  G. P. J. SALOMON  3,326,568
REAR SAFETY SECURING DEVICE FOR SKIS
Filed Sept. 27, 1965  6 Sheets-Sheet 1
Fig: 1
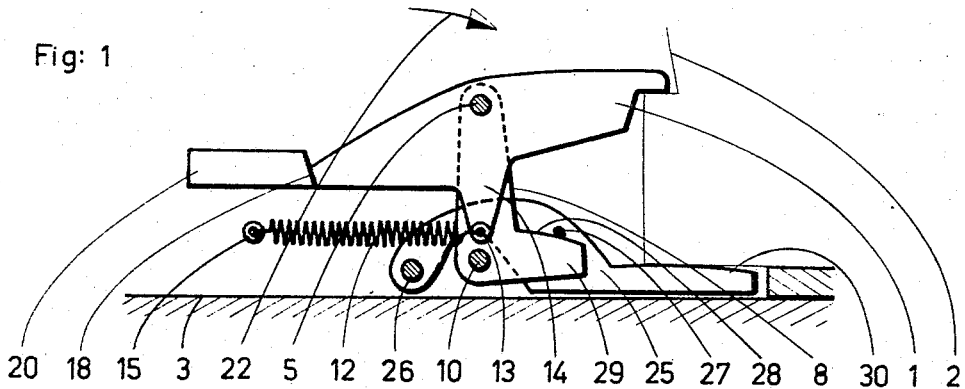
Fig: 2
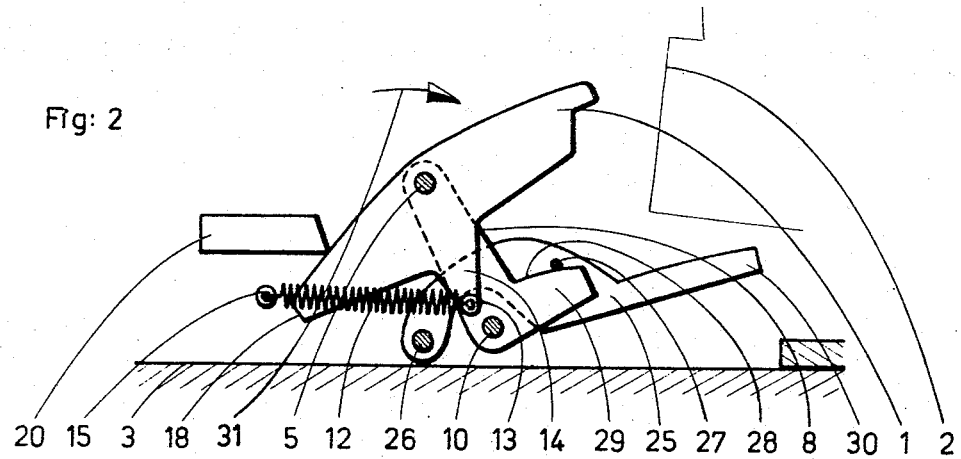
Fig: 3
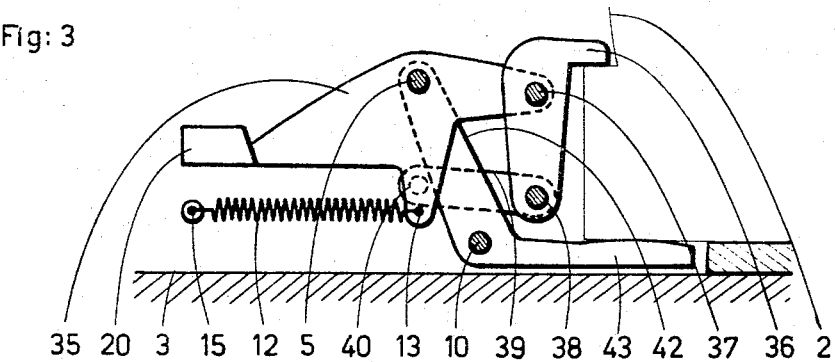
INVENTOR.
Georges P. J. SALOMON
BY
Raymond A. Robic
ATTORNEYS INVENTOR.
Georges P.J. SALOMON June 20, 1967  G. P. J. SALOMON  3,326,568
REAR SAFETY SECURING DEVICE FOR SKIS
Filed Sept. 27, 1965  6 Sheets-Sheet 5
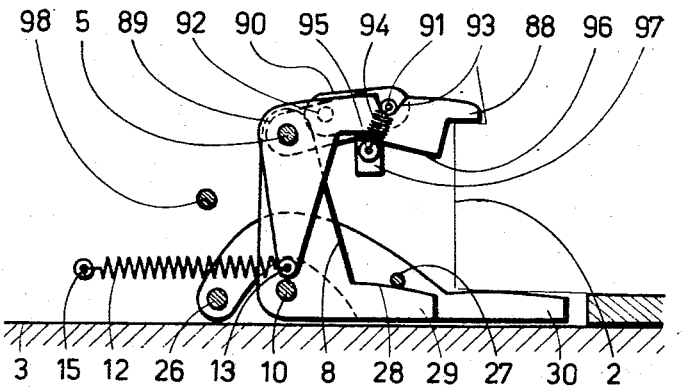
Fig: 13
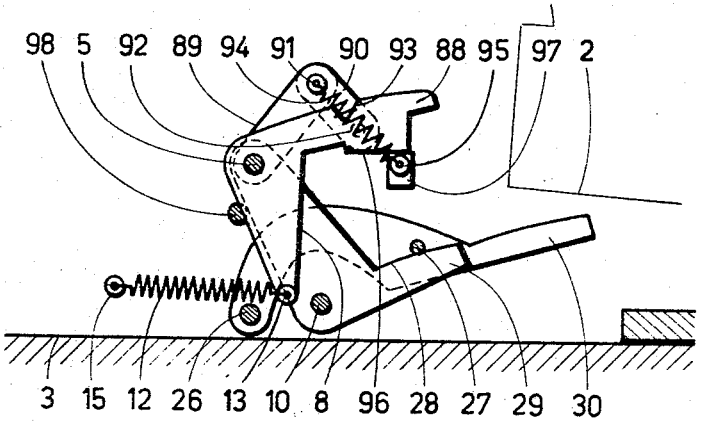
Fig: 14
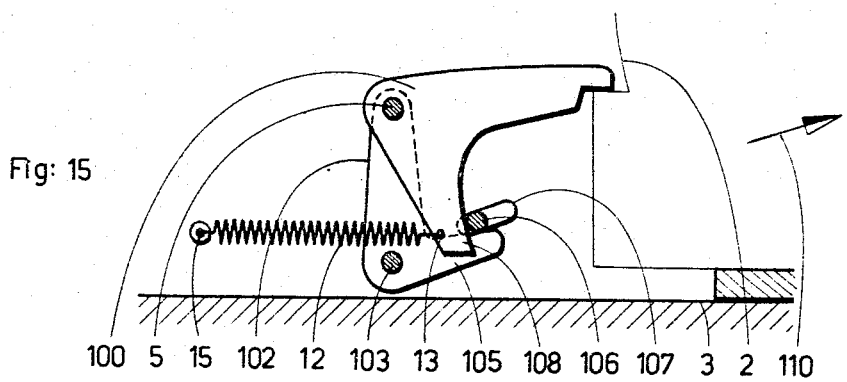
Fig: 15
INVENTOR.
Georges P.J. SALOMON
BY
Raymond A. Robb
ATTORNEYS

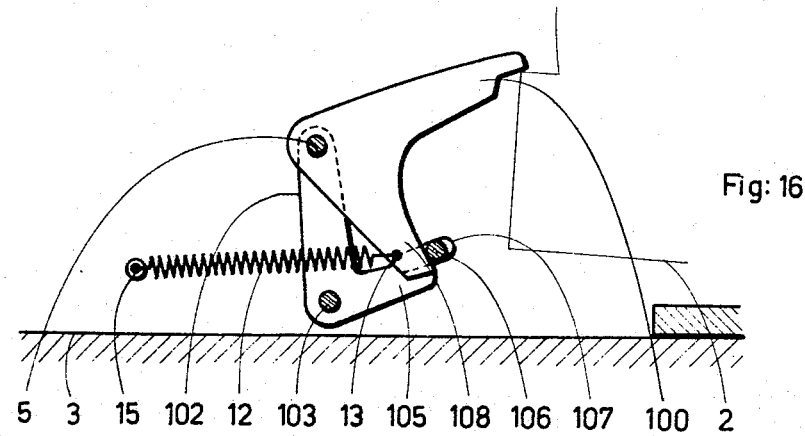
Fig: 16
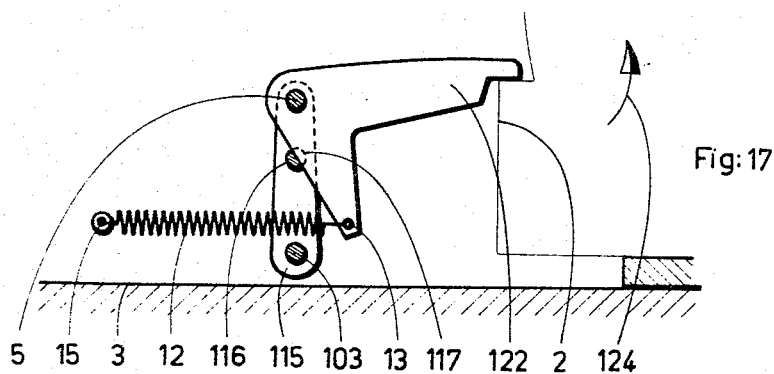
Fig: 17
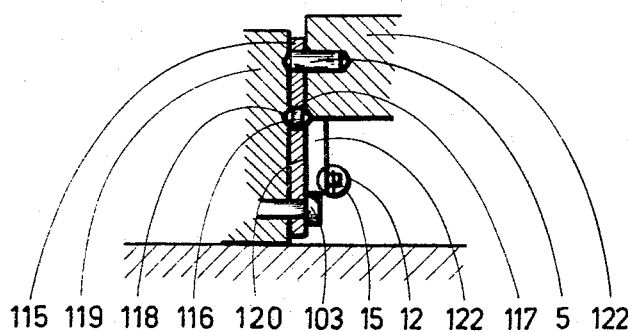
Fig: 18

United States Patent Office 3,326,568
Patented June 20, 1967

3,326,568
REAR SAFETY SECURING DEVICE FOR SKIS
Georges P. J. Salomon, 34 Ave. de Loverchy,
Annecy, France
Filed Sept. 27, 1965, Ser. No. 490,178
Claims priority, application France, Sept. 28, 1964,
989,642
17 Claims. (Cl. 280—11.35)

The present invention relates to a rear safety securing device for skis which differentiates from those heretofore known in that it offers several advantages among which may be cited: easy manufacture, simple operation, good mechanical working of the various constituting parts, free rocking of the retaining jaw, etc.

According to the invention, the rear safety securing device for skis comprises a retaining jaw or the like bearing substantially downwardly on the rear upper edge of the heel of a boot and is characterized in that the said jaw is articulated on an axle which is maintained stationary or substantially so during a first period which is that of the opening movement of the jaw and for a given value corresponding to that of the safety release, the axle thereafter moving rearwardly under the action of a resilient means which is preferably the resilient means of the jaw, thus freeing the heel of the boot from the said retaining jaw. Holding of the articulation axle of the jaw and subsequently its rearwardly directed release may be obtained, always according to the invention, in several ways. For instance, the articulation axle of the jaw may be provided on a lever articulated at the lower end thereof to allow it to rock rearwardly or it is mounted in substantially horizontal guiding means such as slots, grooves, guides, rails etc. On the other hand, the said axle may be retained in substantially stationary position during a first period which is that of the opening of the jaw by having a ledge of the jaw bear against an abutment located forwardly or rearwardly of the articulation axle; by means of a toggle device provided forwardly or rearwardly of the aticulation axle; by means of a lock swinging rearwardly of the lever supporting the jaw etc. The first period of given amplitude of the opening of the jaw has the effect, at the end of the stroke, respectively to free the ledge from the abutment, to break the toggle device or to retract the locking means of the lever supporting the jaw.

The jaw acts on the upper rearward edge of the heel either directly or through an appropriate bearing part articulated to the said jaw and slidably guided or articulated downwardly on a link allowing for instance the said bearing part to generally follow the heel of the boot during the first rocking period preceding triggering of the securing device to open position.

On the other hand, a harnessing device is provided which is made up for instance of an articulated lever comprising an arm coming under the heel, the lever acting by means of noses, lugs or the like on the lever supporting the jaw. The harnessing device may also be formed by an arm integral with the lever supporting the jaw and coming under the heel or still by a lever comprising an arm coming under the heel, the lever acting on the jaw.

The invention will be better understood by reference to the following description and to the appended schematic drawing by way of non-limitative example various preferred embodiments of the invention.

FIGURE 1 is a side elevation schematic view of a rear safety securing device for skis according to the invention, illustrated in closed position;

FIGURE 2 is a side elevation schematic view of the rear safety securing device of FIGURE 1, illustrated in open position;

Figure 4:
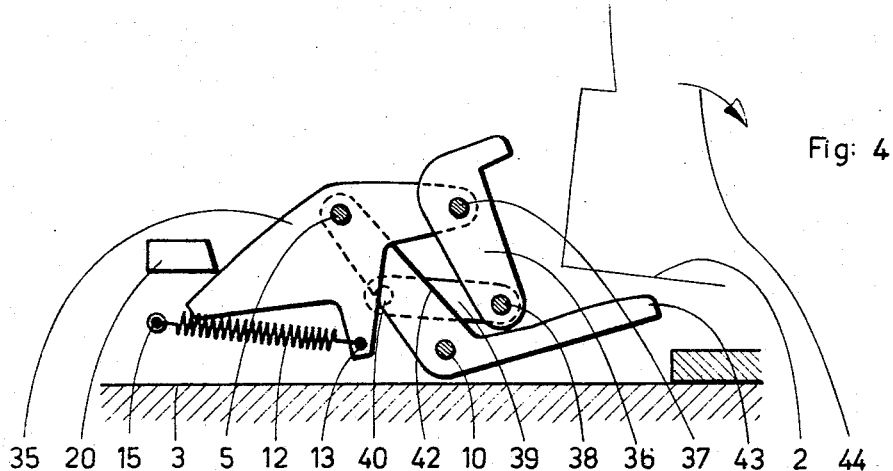

FIGURES 3 and 4, 5 and 6, 7 and 8, 9 and 10, 11 and 12 and 13 and 14 are side elevation schematic views of various embodiments of the rear safety securing devices for skis according to the invention, respectively shown in closed and open positions;

FIGURES 15 and 16 are side elevation schematic views of a rear safety securing device for skis according to another embodiment of the invention shown respectively in closed position and triggered to open position;

FIGURE 17 is a side elevation schematic view of a rear safety securing device for skis according to still another embodiment of the invention, illustrated in closed position;

FIGURE 18 is a partial transverse cross-sectional view of the securing device of FIGURE 17, in closed position.

The rear safety securing device for skis shown in FIGURES 1 and 2 comprises a retaining jaw 1 for holding the heel 2 of a boot on a ski 3 by bearing or pressing down on it substantially vertically. Jaw 1 is articulated on an axle 5 integral with a lever 8 which is in turn articulated on a stationary axle 10. Jaw 1 is brought against heel 2 by means of a tension spring 12 located between and fixed to a pin 13 solid with an appropriate projection 14 of jaw 1 and a stationary retaining finger 15. To avoid that under the action of spring 12 jaw 1 move back before the release by rearward rocking of lever 8, the rear edge of the said jaw 1 comes to bear against a stationary abutment 20. In the closed position of FIGURE 1, the jaw 1 tending to swing according to arrow 22 and being retained against rearward displacement thus ensures stabilization of heel 2 by bearing down on it substantially vertically. Under the rising force of heel 2, as when the skier makes a forward fall, jaw 1 swings or pivots contrary to arrow 22 tensioning spring 12. Then, after a rising motion of predetermined length, the rearward edge 18 of jaw 1 slips away from abutment 20 causing rearward rocking of lever 8 under the action of spring 12 and drawing jaw 1 also rearwardly while releasing the heel 2 of the boot.

The principle of the invention which consists in holding the articulation axle 5 of the jaw stationary during a first period and for a given lifting displacement of the heel is applied in the example of FIGURES 1 and 2 by the fact that holding of axle 5 of jaw 1 is directly obtained by the holding of the said jaw on the abutment 20.

In the securing device shown in FIGURES 1 and 2, a harnessing device is provided which is constituted by a lever 25 articulated on a stationary axle 26 and comprising a finger or pin 27 acting on a ramp 28 of an appropriate arm 29 of the lever 8 carrying the jaw 1. In the open position of FIGURE 2, the rearward rocking of lever 8 has caused rising of projection 30 of lever 25 located under the boot heel 2 by action of arm 29 of lever 8 against pin 27 of lever 25. During harnessing, heel 2 by falling on the ski comes to bear on projection 30 drawing with it lever 25 that thus rocks according to arrow 31 causing rocking of lever 8 forwardly to thus allow jaw 1 to automatically take on the closed position of FIGURE 1. It should be noted that the outline of ramp 28 of arm 29, which could be different from that illustrated, allows a better distribution of the harnessing force provided by heel 2 in relation to the tension in the spring 12.

The securing device shown in FIGURES 3 and 4 differentiates from that of FIGURES 1 and 2 only in that the jaw 1 of FIGURES 1 and 2, acts on heel 2 through a bearing part 36 articulated on the said jaw 35 on an axle 37 and also articulated at its other end on an axle 38 on a link 39 which itself pivots about a stationary axle 40 to thus allow bearing part 36 to generally follow the movement of heel 2 in the first rising period of the latter. On the other hand lever 42 which is similar to lever 8 of FIGURES 1 and 2 comprises an arm 43 adapted to come beneath heel 2 and constituting the harnessing device. Indeed, when the securing device is open as in FIGURE 4 and the skier harnessing the ski, the heel 2 of the boot is lowered causing pivoting of lever 42 according to arrow 44 to thus replace the securing device in the closure position of FIGURE 3.

Figure 5:
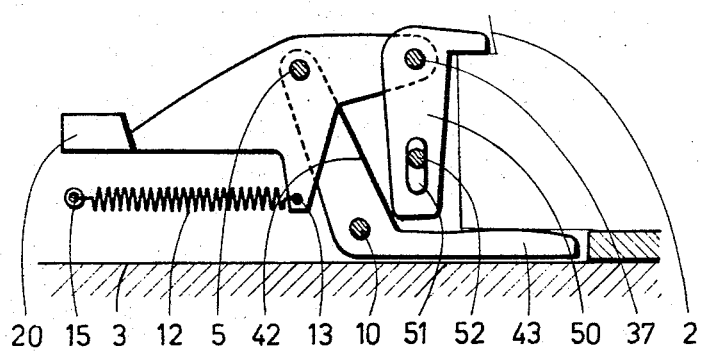
Figure 6:
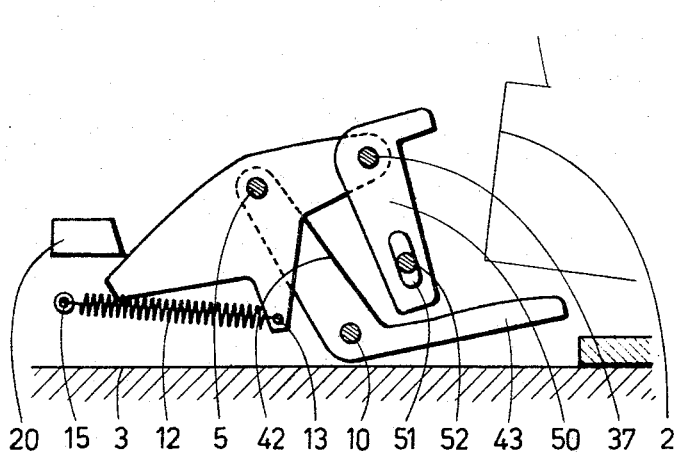

The securing device of FIGURES 5 and 6 only differs from that of FIGURES 3 and 4 in that the bearing part 50 similar to 36 of FIGURES 3 and 4 is not downwardly articulated but is slidably guided, for instance, by means of a slot 51 through the said bearing part 50 across which extends a stationary pin 52. In the first period of the rising of heel 2, the bearing part 50 moves by generally following the movement of heel 2.

Figure 7:
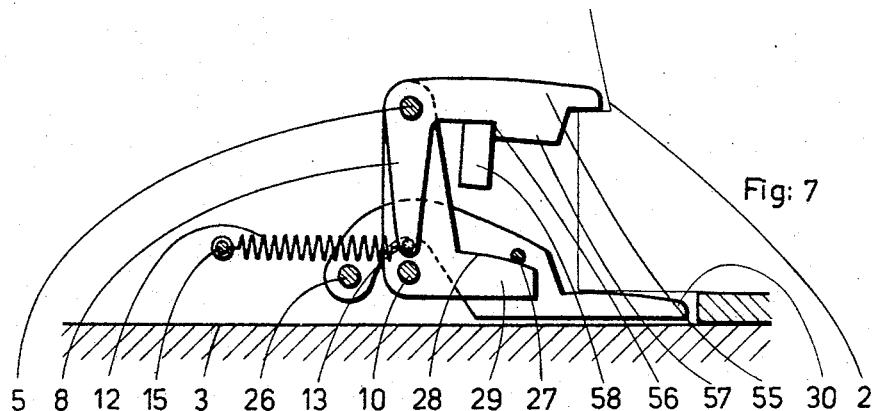
Figure 8:
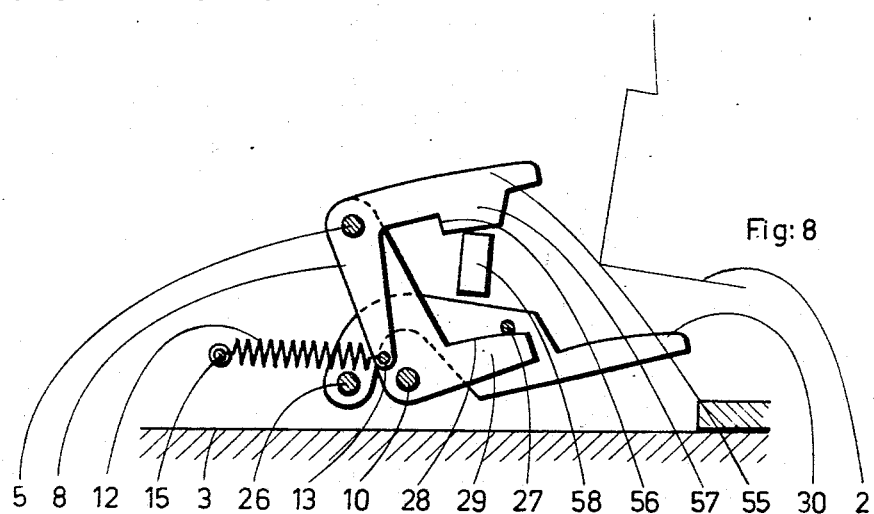

The securing device illustrated in FIGURES 7 and 8 only differentiates from that of FIGURES 1 and 2 in that jaw 55 similar to jaw 1 of FIGURES 1 and 2 is retained in the first period of the rising of the heel 2 by means of an offset 57 formed on jaw 55 and having a rearward edge 56 sitting against an abutment 58 provided between the lever 8 carrying the jaw 55 and the heel 2 of the boot. After heel 2 has moved up a predetermined distance, jaw 55 is released from abutment 58 producing withdrawal of the said jaw 55 and release of heel 2 (FIGURE 8). The harnessing device, identical to that of the securing device of FIGURES 1 and 2, makes it possible to replace the securing device in the closure position of FIGURE 7 upon lowering of heel 2.

Figure 9:
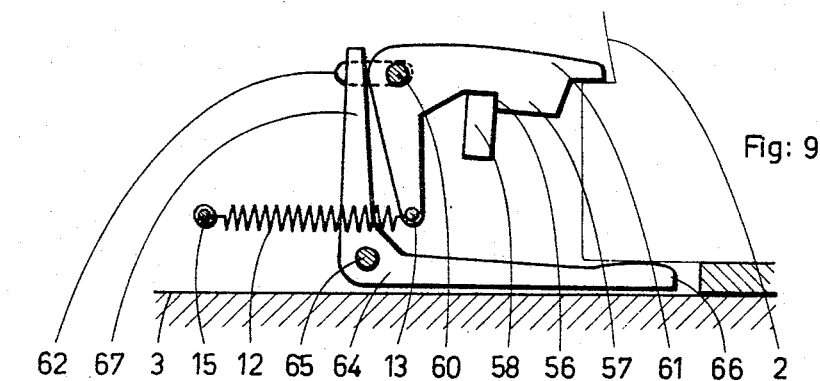
Figure 10:
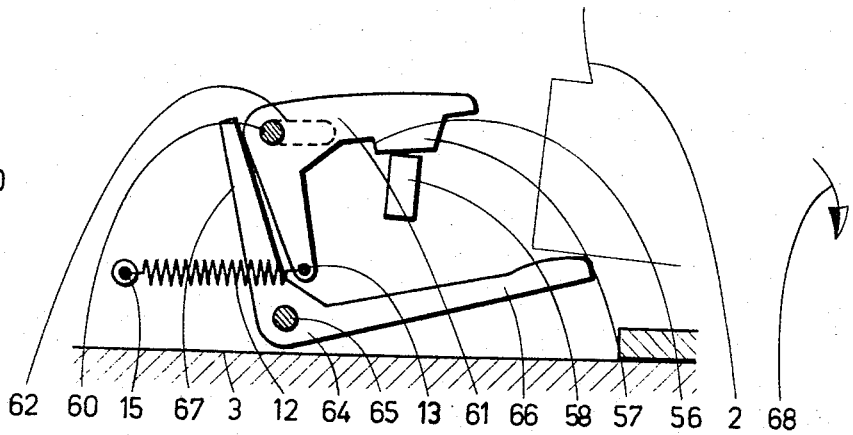

The securing device shown in FIGURES 9 and 10 only distinguishes from that of FIGURES 7 and 8 in that the axle 60 of jaw 61 similar to jaw 55 of FIGURES 7 and 8 is not mounted on a lever but is slidably guided in a slot 62 which may, for instance, be horizontal. The operation of this securing device is identical to that of the device of FIGURES 7 and 8: in a first period and for a given rise of heel 2, jaw 61 is released from abutment 58 allowing withdrawal of the said jaw 61 and release of the heel 2 as shown in FIGURE 10. On the other hand, the harnessing means of the securing device of FIGURES 9 and 10 differentiates from that of FIGURES 7 and 8 in that the harnessing lever 64 which is articulated to pivot about a stationary axle 65 comprises two generally perpendicular arms, one 66 located beneath heel 2 and the other 67 acting against the rear face of jaw 61. During harnessing, the lowering of heel 2 draws lever 64 into rotation according to arrow 68 of FIGURE 10 until the flange 56 of offset 57 of jaw 61 reaches the level of the forward face of abutment 58; jaw 61 then automatically locks in holding position of the heel 2 against ski 3.

Figure 11:
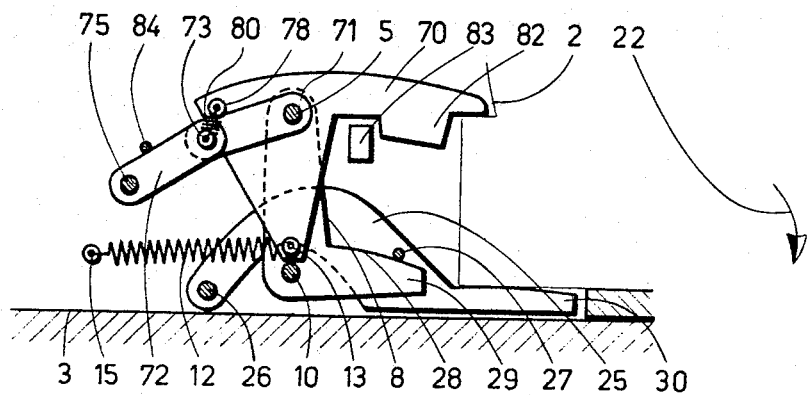
Figure 12:
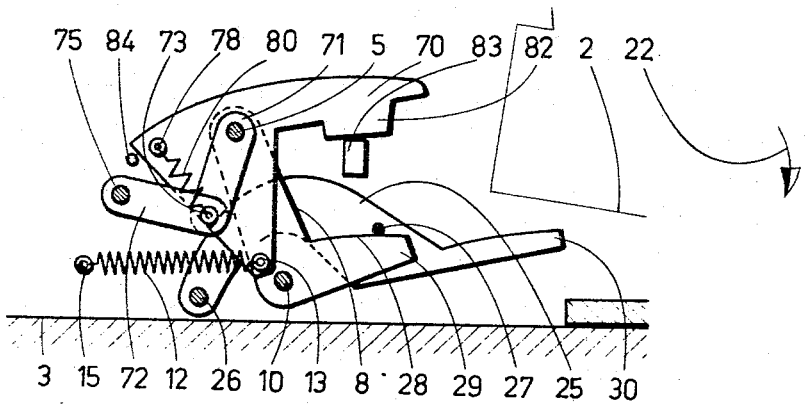

The securing device illustrated in FIGURES 11 and 12 differentiates from that of FIGURES 1 and 2 only by the means provided for holding the jaw 70 in the first period of rising of heel 2. This holding means is constituted by a toggle comprising two levers 71, 72 articulated to one another by means of an axle 73, lever 71 being pivoted on the articulation axle 5 of the jaw 70 and lever 72 being articulated on a stationary axle 75. In the closed position of FIGURE 11, the axle 73 lies above the line joining the centers of the two axles 5 and 75 and the lever 71 comes to abut against a pin 78 integral with jaw 70, the toggle being retained in that position by a return spring 80 provided between axle 73 and pin 78. Jaw 70 cannot move back and the stress in spring 12 tends to pivot it in the direction of arrow 22 thus ensuring proper holding of the heel 2 on ski 3. During the rising period of heel 2, jaw 70 swings contrary to arrow 22 breaking the toggle by pressure of pin 78 on lever 71 generally in the direction of axle 73. Once the toggle is broken, the jaw 70 rocks rearwardly to release heel 2. After breaking of the toggle in one direction jaw 70 comes to rest by means of its offset 82 sitting against a stationary abutment 83 and after breaking in the other direction against a stationary abutment 84. The harnessing device does not differentiate at all from that of the securing device of FIGURES 1 and 2. Lowering of heel 2 causes forward rocking of lever 8 and closes jaw 70 on heel 2 (FIGURE 11), spring 80 automatically locking the toggle device.

The securing device shown in FIGURES 13 and 14 only distinguishes from that of FIGURES 11 and 12 in that the toggle device for holding the articulation axle 5 of jaw 88 (similar to jaw 70 of FIGURES 11 and 12) is no longer located rearwardly of lever 8 but forwardly thereof. This device is constituted by two levers 89 and 90 interconnected by an axle 91, lever 89 being articulated on one side to the articulation axle of jaw 88 while the second lever 90 is articulated on the other side to a stationary axle 92. The locking is by tension, the two levers 89 and 90 being disposed one over the other as shown in FIGURE 13 contrary to the toggle device of FIGURES 11 and 12 which acts in compression in that the levers 71 and 72 are extended. In this closed position of FIGURE 13, the stationary axle 92 is located above the line extending through the axles 5 and 91 and an extension of axle 91 moves downward in an appropriate notch 93 of jaw 88. In that position, the toggle is stressed by a spring 94 tensioned between the axle 91 and a stationary finger 95. The jaw is stabilized against rearward motion. By rising heel 2, jaw 88 pivots causing axle 91 to move above the line extending between the axles 5 and 92 causing unlocking of the toggle and opening of the securing device. In the closed position, the jaw 88 has its offset 96 sitting against stationary abutment 97 and in open position it sits against the stationary abutment 98.

The securing device of FIGURES 15 and 16 only distinguishes from that of FIGURES 1 and 2 in that articulation axle 5 is retained in retracted position, during the first period of the rising of heel 2 by locking of lever 102 against rearward rocking. To lever 102 is articulated jaw 100 on axle 5. Lever 102 is in turn articulated at the base thereof on a stationary axle 103 corresponding to axle 10 of lever 8. Locking of lever 102 against rearwardly rocking is obtained by abutment of an arm 105 of lever 102 against a transverse pin 106 extending across a slot 107 of the body of the securing device. As heel 2 first rises, jaw 100 pushes on pin 106 through an arm 108 depending therefrom in such a manner as to force sliding thereof along arrow 110 in the slot 107 until the pin 106 reaches the extreme end of arm 105 of lever 102 as shown in FIGURE 16. Thus being released, lever 102 rocks rearwardly bringing with it the jaw 100 and releasing heel 2 of the boot.

The securing device illustrated in FIGURES 17 and 18 only distinguishes from that of FIGURES 15 and 16 in that the locking of lever 115, similar to lever 102 of FIGURES 15 and 16, against rearwardly rocking during the first period of rising of heel 2 is obtained by means of a finger 116 mounted in a hole 117 through lever 115, the said finger 116 having a rounded end protruding from lever 115 and housed in a suitable groove 118 of the body 119 of the securing device to retain the said lever 115 against rocking, the pin being held therein by the lateral face 120 of jaw 122. As heel 2 starts to rise, jaw 122 pivots according to arrow 124 until finger 116 is completely released. At that moment, finger 116 moves out of groove 118 of body 119 thus releasing lever 115 which then rocks rearwardly driving with it jaw 122 to thus release the heel 2 of the boot.

According to a non-illustrated embodiment of the invention, the articulation of the jaw on the supporting lever is obtained through a knuckle joint.

One would remain within the scope of the invention regardless of the number, the shape, the dimensions, the proportions and the arrangement of the various component parts of the securing device, whatever be the holding and releasing means for the articulation axle of the jaw or the like and the harnessing means, even non-illustrated.

Similarly, the various component parts of the securing device can be made of various materials and/or combination of materials, can offer various appearances, be subjected to various treatments, etc. The means for holding the articulation axle of the jaw could be obtained by any means acting either directly on the said axle or on one of the parts which are directly or indirectly integral therewith: jaw, jaw-carrier lever, etc. without departing from the spirit of the invention.

I claim:
1. In a rear safety securing device for skis, having a holding jaw or the like adapted to bear down with pressure at one end on the upper rear edge of the heel of a ski boot, the combination comprising:
  (a) rockable lever means including an axle on which said holding jaw is pivotably mounted at a point thereon away from said one end with the pivot axis substantially parallel with the rocking axis of said rockable lever means;
  (b) retaining means to hold said lever means substantially stationary while allowing limited rearward pivoting of said holding jaw under the action of said boot heel as it rises a predetermined height; said retaining means becoming inactive as said boot heel moves beyond said predetermined height;
  (c) resilient means to cause rearward rocking of said rockable lever means after said retaining means has become inactive.
2. A combination as claimed in claim 1, wherein said resilient means is a coil spring connected at one end to a fixed point relative to the ski and at the other end to said holding jaw away from the pivot axle thereof.
3. A combination as claimed in claim 1, wherein said rockable lever means includes a lever pivoted at one end to a point fixed in relation to the ski and having said jaw pivot axle at the other end thereof whereby said lever means may move in an arc of circle when said retaining means becomes inoperative.
4. A combination as claimed in claim 3, wherein said holding jaw has a projection extending in the direction of the fixed pivot point of said rockable lever; said resilient means being a coil spring connected at one end to another point fixed in relation to the ski and at the other end to said projection in such a manner as to cause said holding jaw to press down on said boot heel.
5. A combination as claimed in claim 1, wherein said retaining means comprises a fixed block and a shoulder formed on said holding jaw and engageable with said block to lock said lever means against rocking under the action of said resilient means; said fixed block and shoulder so arranged that said shoulder slips away and disengages from said block when said holding jaw is rearwardly pivoted following rising of said boot beyond said predetermined height.
6. A combination as claimed in claim 1, wherein said retaining means comprises a toggle mechanism including interconnected toggle arms one of which is pivoted to a fixed point and the other is connected to said holding jaw and spring means drawing said arms into locking position of said retaining means.
7. A combination as claimed in claim 1, wherein said retaining means comprises a locking means holding said lever means substantially stationary and releasing means on said holding jaw acting on said locking means when said holding jaw pivots subsequent to rising movement of said heel beyond said predetermined height to release said lever means for rearward rocking.
8. A combination as claimed in claim 7, wherein said locking means comprises a forward arm projecting from the lever of said lever means; a forwardly movable pin which in locked position of said lever means stands in the path of rearward rocking of said lever means and wherein said releasing means is a projection downwardly extending from said holding jaw to rearwardly engage said pin to move it forwardly when said heel is raised and cause disengagement thereof from said forward arm of said lever when said heel is raised beyond said predetermined height.
9. A combination as claimed in claim 7, wherein said securing device is formed with a body fixed to said ski and provided with a groove facing toward said lever of said lever means; said retaining means comprises a pin movable across a hole through said lever so constructed and arranged that said holding jaw in locked position of said heel forces the head of said pin into said groove to lock said lever means against rocking and when said heel has been raised beyond said predetermined height, said holding jaw has pivoted an angle sufficient to free said pin to move out of said groove.
10. A combination as claimed in claim 1, wherein said holding jaw presses down on said heel directly.
11. A combination as claimed in claim 1, including a bearing part pivoted to the forward end of said holding jaw and bearing on said heel; a link pivoted at one end to said bearing part and at the other end to a point fixed in relation to said ski.
12. A combination as claimed in claim 1, including a bearing part pivoted to the forward end of said holding jaw and formed with a through slot below the pivot thereof and a fixed pin extending across said slot for guiding said bearing plate during rocking of said lever means.
13. A combination as claimed in claim 1, including harnessing means responsive to lowering of the boot heel to cause forward rocking of said lever means.
14. A combination as claimed in claim 13, wherein said harnessing means comprises a forwardly projecting member of said lever means having an upper arcuate edge defining a ramp; a harnessing element pivoted at one end at a fixed point and of such length as to have the other end come under the boot heel; a pin laterally projecting from said harnessing element; said harnessing means so arranged as to cause forward rocking of said lever means as the boot heel depresses said harnessing element with said lateral pin riding on said ramp.
15. A combination as claimed in claim 13, wherein said harnessing means is a forwardly projecting member of said lever means of such a length as to have the forward end thereof come under the boot heel whereby to be depressed by said boot heel as the latter is lowered during harnessing.
16. In a rear safety securing device for skis, the combination comprising:
  (a) a holding jaw adapted to press down at one end on the upper rear edge of the heel of a ski boot;
  (b) means mounting said holding jaw for pivotal movement about an axis transverse of the ski and for limited linear displacement relative to said ski boot;
  (c) retaining means to hold said holding jaw from said linear displacement while allowing limited rearward pivoting thereof under the action of said boot heel as it rises a predetermined height; said retaining means becoming inoperative as said boot heels move beyond said predetermined height, and
  (d) resilient means to cause forward pivoting of said holding jaw and linear rearward displacement thereof when said retaining means becomes inoperative.
17. A combination as claimed in claim 16, including a harnessing L-shaped lever pivoted at the apex thereof and having an upstanding branch abutting the rear end of said holding jaw to cause forward linear displacement thereof against said resilient means and a generally horizontal branch adapted to project beneath said boot heel to be depressed thereby.

References Cited
UNITED STATES PATENTS
2,851,278   9/1958   Berlenbach _____ 280—11.35
3,129,951   4/1964   Lusser _____ 280—11.35

FOREIGN PATENTS
712,492   6/1965   Canada.

BENJAMIN HERSH, *Primary Examiner.*

J. H. BRANNEN, *Assistant Examiner.*